Jan. 23, 1962 G. F. VANDERSCHMIDT 3,018,376
GAS DENSITY MEASUREMENT
Filed Nov. 29, 1957
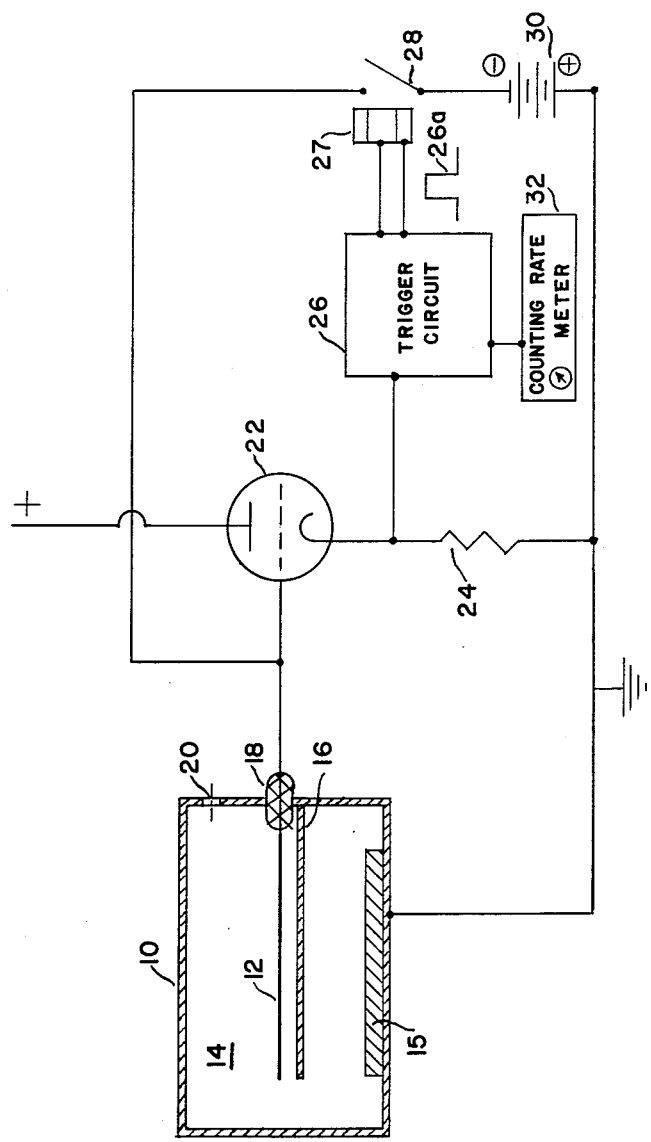
INVENTOR.
George F. Vanderschmidt
BY
Oliver W Hayes

United States Patent Office 3,018,376
Patented Jan. 23, 1962

3,018,376
GAS DENSITY MEASUREMENT

George F. Vanderschmidt, Belmont, Mass., assignor to National Research Corporation, Cambridge, Mass., a corporation of Massachusetts
Filed Nov. 29, 1957, Ser. No. 699,860
8 Claims. (Cl. 250—83.6)

This invention relates to measuring and more particularly to the measuring of gas density under widely varying conditions of temperature. The measurement of gas density is capable of indicating pressure when temperature is known, and such measuring instruments are useful as vacuum gauges, high altitude altimeters and barometers.

The principal object of the present invention is to provide a simple and accurate gas density measuring apparatus which is capable of operating over a wide range of densities. Another object of the invention is to provide measuring apparatus of the above type which is particularly suitable for telemetering information regarding upper atmospheric density encountered by rockets and high altitude balloons.

Still another object of the invention is to provide an improved vacuum gauge.

Other objects of the invention will in part be obvious and will in part appear hereinafter.

The invention accordingly comprises the apparatus possessing the construction, combination of elements and arrangement of parts which are exemplified in the following detailed disclosure, and appended drawing, and the scope of the application of which will be indicated in the claims.

The measurement of pressure has recently been very successfully achieved by the use of an ionization gauge employing a source of radioactivity for creating ions in the gas whose density (and therefore its pressure) is to be measured. One such gauge is shown in Downing Patent 2,497,213. Such a gauge is extremely useful for numerous applications. However, it does require very accurate and stable amplification for the extremely small ion currents encountered in such a gauge. When the miniaturization of circuit components is of the utmost importance in order to save space and weight, the problems inherent in dealing with extremely small ion currents become more difficult to circumvent. This is particularly true when the ion current must be amplified and then telemetered to the ground from a high altitude rocket.

In the present invention gas density is measured by providing a pair of electrodes in an ionization chamber which may be conveniently defined by one of the electrodes. A radioactive source (such as radium, tritium, or other sources of alpha or beta rays) is positioned (preferably in the interior of the ionization chamber) so as to ionize gas molecules in this chamber. Means are provided for applying a charge to the pair of electrodes by impressing a predetermined voltage across the capacitance formed by the pair of electrodes. This voltage across the electrodes will serve to collect the ions generated in the ionization chamber. During this collection one of the pair of electrodes is effectively isolated from the charging voltage source so that the collection of ions will gradually neutralize the charge on the electrodes and reduce the voltage across the pair of electrodes. When this voltage has been lowered a predetermined amount, the chamber is preferably charged back to its original voltage by some means and the cycle begins again. As long as the chamber voltage remains high enough to collect substantially all the ions formed, the voltage across the isolated chamber, $V$, is $$V = V_0 - It/C$$

where $V_0$ is the initial voltage at time $t=0$, $I$ is the ion current, and $C$ is the capacitance of the chamber. Since $I$ may be linearly dependent on the gas density, the measurement of the time between successive chargings may give an inverse linear indication of the pressure, and the frequency of chargings may have a direct linear dependence upon density.

Referring now to the drawing, which is a schematic diagram, there is illustrated one preferred embodiment of the invention wherein a pair of electrodes 10 and 12 are provided; the electrode 10 being in the form of a container defining therewithin an ionization chamber 14. The electrode 10 preferably supports a placque 15 containing a radioactive material such as radium or tritium. This placque 15 emanates radioactive particles (e.g., alpha or beta rays) into chamber 14 to ionize gas entering the chamber through an opening 20. A shield 16 is preferably provided between the placque 15 and the electrode 12 so as to prevent direct impingement of the radioactive particles upon the electrode 12. This electrode 12 serves, in the preferred embodiment, as a positive ion collector. Therefore, electrode 12 is maintained at a potential which is negative with respect to the other electrode 10. Collector electrode 12 is supported by an insulator 18 and is directly coupled to an electrometer tube 22, which is indicated as a simple triode. The triode 22 is connected, as a cathode follower, by means of a cathode resistor 24, to a trigger circuit 26. Trigger circuit 26 is arranged to produce an output voltage pulse whenever the voltage drop across resistor 24 rises to a predetermined amount by conduction of electrometer tube 22. The pulse generated by trigger circuit 26 is fed to a relay solenoid 27 which actuates a switch 28 for a short instant of time to connect the negative side of a battery 30 directly to collector electrode 12 so as to place a predetermined negative charge on the collector electrode 12. The application of voltage 30 also makes the grid of the tube 22 negative, so that it no longer allows current to flow through cathode resistor 24. Accordingly, trigger circuit 26 is returned to its original state. A counting rate meter 32 is preferably provided for indicating the frequency of operation of the trigger circuit 26. As shown, the positive side of the battery 30, the bottom of cathode resistor 24, and electrode 10 are all grounded.

In the operation of the above specific embodiment of the invention, a predetermined voltage difference is created between collector electrode 12 and electrode 10 by closing switch 28 momentarily so as to apply voltage of battery 30 directly to these two electrodes. Switch 28 is then opened and charge exists on electrodes 10 and 12. As mentioned previously, the circuit arrangement is such that the collector electrode 12 is preferably maintained at a predetermined negative voltage with respect to electrode 10. When the switch 28 is open, there is no external path for discharging the voltage across electrodes 10 and 12. However, the radioactive particles emanating from the radioactive source 15 ionize the gas in the ion chamber 14 and positive ions are collected by collector electrode 12, thereby decreasing the voltage difference between the electrodes. The negative voltage existing on the collector electrode 12 serves as a negative bias on the electrometer tube 22. When the voltage difference between electrodes 10 and 12 drops sufficiently so that tube 22 can start to conduct current, then a voltage will be generated across the cathode resistor 24. Trigger circuit 26 is accordingly energized to produce a pulse (as shown at 26a), thus energizing solenoid 27 to close switch 28 and thereby re-establishing the initial negative static voltage on collector electrode 12. This makes the grid of tube 22 negative and de-energizes the trigger circuit.

The frequency with which the above cycle is repeated, for a given set of circuit constants, is a direct function of the density of the gas in the ion chamber 14. When the gas is very dense, numerous ions are generated due to the bombardment of the gas with the radioactive particles. Accordingly, the chamber voltage is discharged very rapidly. When the density of the gas is very low, the rate of ion generation is correspondingly low and the charge is dissipated much more slowly. The time of discharge of the voltage to the point at which the associated circuits will re-establish the initial voltage is dependent, for a given gas density and chamber size, upon a number of circuit constants. The circuit constants of particular importance are (a) the strength of the radioactive source 15, (b) the voltage at which trigger circuit 26 is actuated, (c) the capacitance between electrodes 10 and 12, and (d) the value of the initial voltage (i.e., battery 30). These circuit constants can be made variable to give any desired discharge time (or alternately any desired count rate) for a given density of gas. This permits ready calibration of the instrument for the particular use desired. For example, when the instrument is to be used as a vacuum gauge and the counting rate meter is graduated in mm. Hg absolute, the instrument can easily be accurately calibrated by adjustment of the value of the voltage source 30 so as to give a pressure indication which corresponds to that of a McLeod gauge measuring the same vacuum.

It should be noted that a number of ways of recharging the chamber when its voltage falls to a predetermined value are suitable within the spirit of this invention.

In general, it is preferred that the voltage across the two electrodes 10 and 12, even at its lowest point, be sufficiently large to provide for linear decay of the voltage with a constant gas density. This is readily obtained by providing a minimum voltage which is always sufficiently high to collect all of the ions generated in the chamber 14.

While one preferred embodiment of the invention has been described above, numerous modifications thereof may be made without departing from the spirit of the invention. For example, the switch 28 may be replaced by a high impedance diode through which a negative pulse can be fed to the electrode 12. Also, numerous trigger circuits well known in the art can be employed, and various means of generating a negative pulse rather than the use of a battery are feasible. An additional capacitor may be provided in parallel with the capacitance of the two electrodes 10 and 12, if desired, to change the rate of voltage decay. Numerous methods of measuring the decay time can be employed, including such means as frequency meters, strip chart recorders, integrating voltmeters, and the like. The dimensions of the chamber may be made variable and the intensity source may, if desired, be modified by the use of suitable movable shields. The apparatus is particularly adapted for miniaturization since its components can be made extremely simple and insensitive to temperature, and its output is well adapted to standard telemetering circuits or techniques.

What is claimed is:

1. Apparatus capable of measuring gas density under widely varying conditions of temperature comprising a radioactive source of ionizing agent activity whose emission of ionizing agents is substantially independent of temperature and electric field, a pair of electrodes for collecting ions generated by the ionizing agents, means for applying a charge to the pair of electrodes by impressing a predetermined initial voltage across said pair of electrodes, means for isolating the pair of electrodes, means for determining the time at which said isolation of the electrodes is effected, and means for determining the time at which the charge across said electrodes has been decreased by a given amount due to flow of ion current between said pair of electrodes, the elapsed interval between said two times indicating the gas density and varying as an inverse function of said gas density.

2. Measuring apparatus comprising an ionization chamber, a radioactive source of ionizing agent activity in position to ionize gas in the ionization chamber, a pair of electrodes for collecting positive and negative ions generated in the ion chamber by the ionizing agents, a voltage source arranged to be connected across the electrodes for impressing a predetermined initial voltage across said pair of electrodes, means for isolating said electrodes from the voltage source while leaving said pair of electrodes charged to said impressed voltage, said voltage being reduced by ion current flowing between the electrodes, means for reconnecting the electrodes to the voltage source to recharge the electrodes to their initial voltage when the voltage has been reduced to a predetermined voltage, and means for measuring the frequency of charge and discharge of the voltage between the electrodes.

3. The apparatus of claim 2 wherein the ionization chamber is defined by one of the electrodes.

4. The apparatus of claim 2 wherein one of the electrodes is maintained at ground potential and the other electrode is charged to a negative voltage with respect to ground.

5. The apparatus of claim 2 wherein the final voltage to which the electrode charge is reduced is sufficiently high to provide for substantially complete collection of the ions produced in the ion chamber.

6. The apparatus of claim 2 wherein the voltage source is adjustable to permit calibration of the apparatus against a standard.

7. The apparatus of claim 2 wherein the voltage across the electrodes is used to control the operation of an electron tube which, in turn, controls the means for reestablishing the voltage across the electrodes.

8. Apparatus for measuring the degree of ionization of a gas when subjected to a predetermined amount of ionizing radiation, said apparatus comprising an ionization chamber, a radioactive source of ionizing agent activity positioned to subject gas in said ionization chamber to said predetermined amount of ionizing radiation, a pair of electrodes for collecting positive and negative ions generated in the ion chamber by the ionizing agents, a voltage source arranged to be connected across the electrodes for impressing a predetermined initial voltage across said pair of electrodes, means for isolating said electrodes from the voltage source while leaving said pair of electrodes charged to said impressed voltage, said voltage being reduced by ion current flowing between the electrodes, means for reconnecting the electrodes to the voltage source to recharge the electrodes to their initial voltage when the voltage has been reduced to a predetermined voltage, and means for measuring the frequency of charge and discharge of the voltage between the electrodes, said frequency being a direct function of the degree of ionization of the gas.

References Cited in the file of this patent

UNITED STATES PATENTS

| | | |
|---|---|---|
| 2,634,609 | Obermaier | Apr. 14, 1953 |
| 2,735,944 | Greer | Feb. 21, 1956 |
| 2,739,283 | Roehrig | Mar. 20, 1956 |
| 2,740,894 | Deisler et al. | Apr. 3, 1956 |
| 2,761,976 | Obermaier | Sept. 4, 1956 |
| 2,861,191 | Chao et al. | Nov. 18, 1958 |
| 2,866,100 | Leaver | Dec. 23, 1958 |
| 2,871,365 | Cohen et al. | Jan. 27, 1959 |
| 2,874,305 | Wilson et al. | Feb. 17, 1959 |
| 2,883,542 | Jacobs | Apr. 21, 1959 |
| 2,908,819 | Marx | Oct. 13, 1959 |

FOREIGN PATENTS

| | | |
|---|---|---|
| 398,722 | Great Britain | Sept. 21, 1933 |